Nov. 23, 1948.  A. A. KOLLMAN  2,454,656
MECHANICAL GALLOPING HORSE
Filed Aug. 6, 1946  2 Sheets-Sheet 1

Inventor
A. A. Kollman
By Wilfred E. Lawson
Attorney

Nov. 23, 1948.  A. A. KOLLMAN  2,454,656
MECHANICAL GALLOPING HORSE
Filed Aug. 6, 1946  2 Sheets-Sheet 2

Inventor
A. A. Kollman
By Wilfred E. Lawson
Attorney

Patented Nov. 23, 1948

2,454,656

UNITED STATES PATENT OFFICE 2,454,656

MECHANICAL GALLOPING HORSE

Alexander A. Kollman, Los Angeles, Calif.

Application August 6, 1946, Serial No. 688,764

6 Claims. (Cl. 280—1.19)

1

This invention relates to a land vehicle and has relation more particularly to a device of this kind of a wheel type and which is primarily adapted for use as a hobby horse by children.

It is also an object of the invention to provide a device of this kind constructed in a manner whereby the same is constructed to travel under the influence of the weight of the child occupying the saddle or seat of the device.

Another object of the invention is to provide a device of this kind including ground-engaging supporting wheels, certain of which being driven through the action of a rocking element operated by the occupant of the saddle or seat of the device.

The invention consists in the details of construction and in the combination and arrangement of the several parts of my improved vehicle whereby certain improvements are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

2

Figure 1:
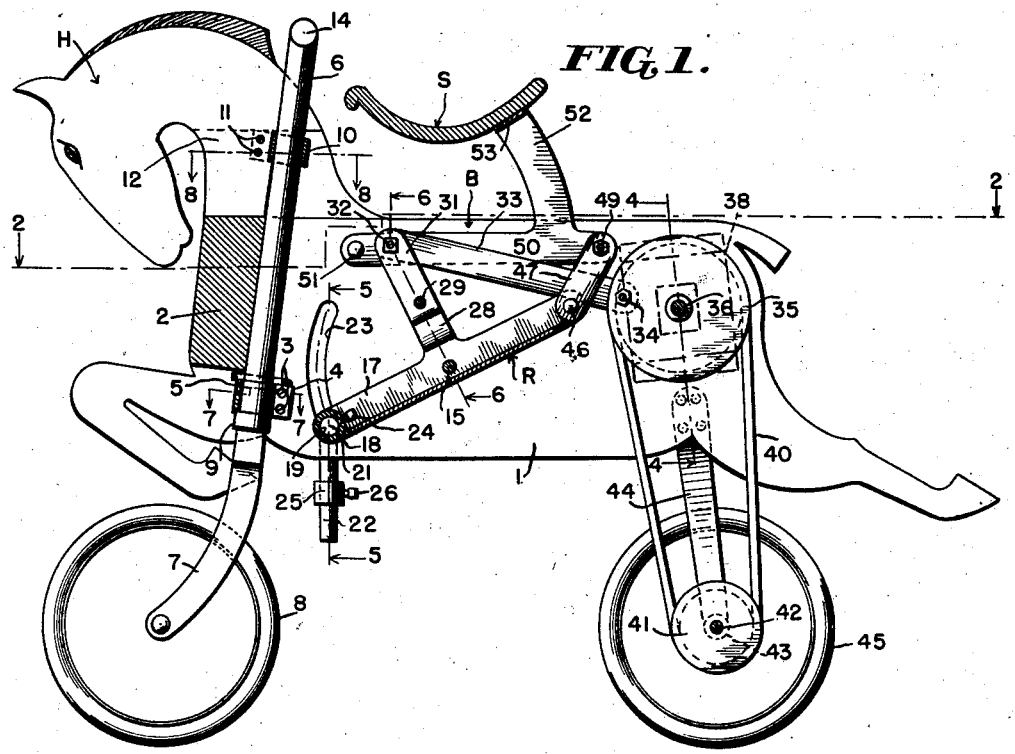
Figure 1 is a view partly in side elevation and partly in section illustrating a vehicle constructed in accordance with an embodiment of the invention.
Figure 2:
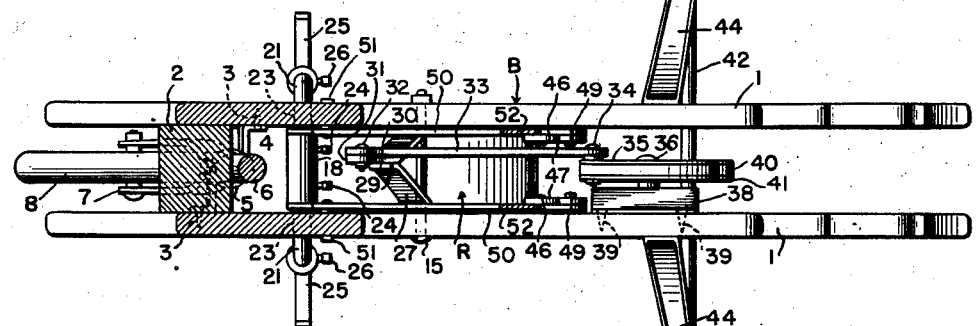
Figure 2 is a sectional view taken substantially on the line 2—2 of Figure 1, looking in the direction of the arrows.
Figure 7:
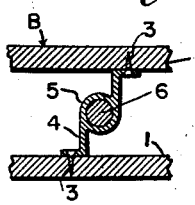
Figure 7 is an enlarged fragmentary detailed sectional view taken substantially on the line 7—7 of Figure 1, looking in the direction of the arrows.
Figure 8:
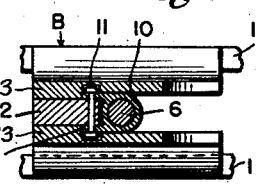
Figure 8 is an enlarged fragmentary detailed sectional view taken substantially on the line 8—8 of Figure 1, looking in the direction of the arrows.
Figure 3:
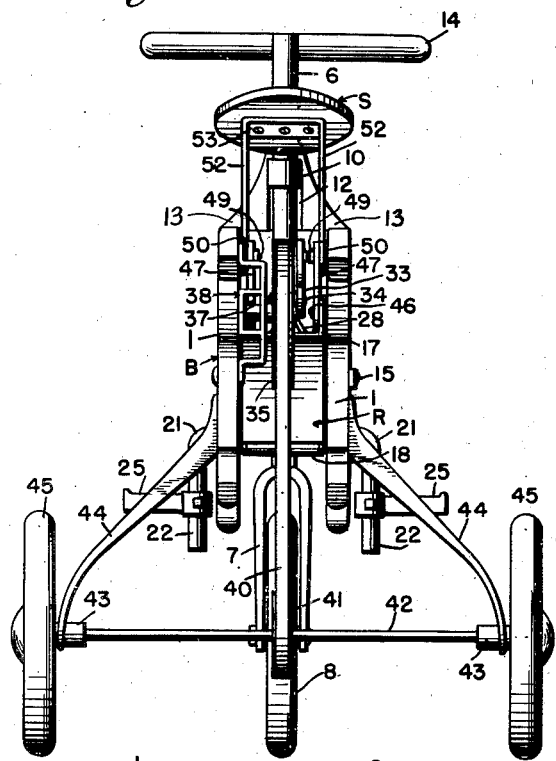
Figure 3 is a view in rear elevation of the device as herein embodied.
Figure 4:
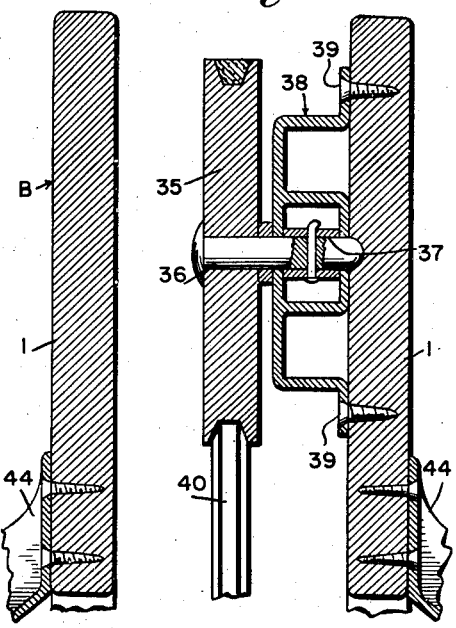
Figure 4 is a fragmentary enlarged detailed sectional view taken substantially on the line 4—4 of Figure 1, looking in the direction of the arrows.
Figure 5:
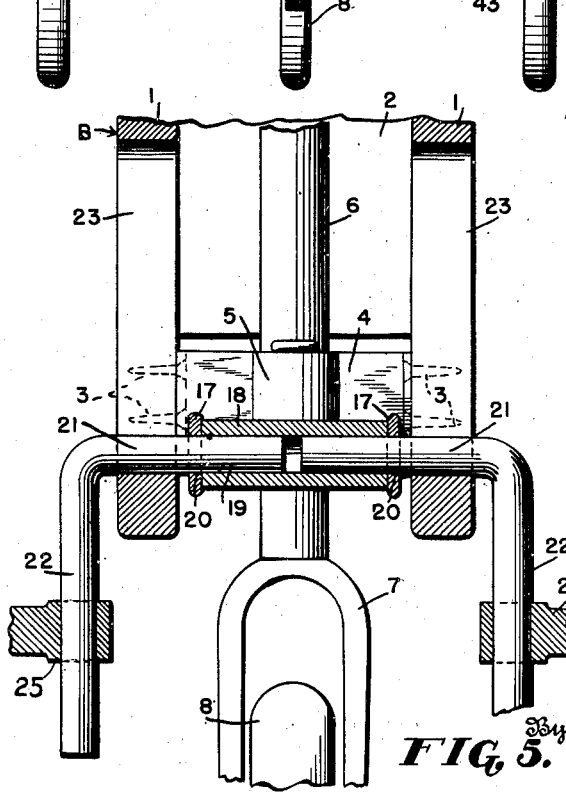
Figure 5 is an enlarged fragmentary detailed sectional view taken substantially on the line 5—5 of Figure 1, looking in the direction of the arrows.

In the embodiment of the invention as illustrated in Figure 1, B denotes a body member comprising two side walls 1 of substantially duplicate construction and arranged side by side in predetermined spaced relation.

As illustrated in the accompanying drawings, each of these side walls or plates 1 is in simulation of a prancing horse, although it is believed to be apparent that they may be of such other design or configuration as the requirements of practice may prefer.

As is clearly illustrated in the accompanying drawings, these walls or plates 1 are flat and interposed between the front end portion of the walls or plates 1 is a spacer block 2 which also provides means for maintaining the walls or plates 1 at the forward portions in desired assembled relation. This block 2 terminates a desired distance above the lower margins of the walls or plates 1 and interposed between said walls or plates 1 below the block 2 and suitably anchored thereto as at 3 by screws or the like is a cross member 4, the central portion of which is formed to provide a bearing sleeve 5, the bore of which is disposed in a substantially vertical direction.

Disposed from below through the bearing sleeve 5 is an elongated straight steering rod 6, cylindrical in cross section and which is provided at its lower end with a downwardly disposed fork 7 with which is operatively engaged in a well-known manner, a front steering wheel 8. The fork 7 is substantially entirely below the body member B and the rod 6 immediately adjacent to and above the fork 7 has fixed thereto a surrounding bearing or thrust collar 9 which has direct contact from below with the bearing sleeve 5.

The head H has a downwardly extending neck portion 12 which terminates against the top of the block 2 and upon either side of this portion is a fill-out member 13 which rests upon the top edge of the adjacent wall 1.

The upper portion of the steering rod or column 6 is rotatably disposed through a bearing sleeve 10 which has spaced ears 10' between which the back edge of the neck portion 12 is positioned and passing through these ears and the neck portion, is an anchoring bolt 11 which secures the bearing sleeve in position. The top extremity of the rod or column 6 is herein disclosed as carrying a cross member 14, whereby the rod or column 6 may be readily turned as desired by the occupant of the saddle or seat S to control the direction of travel of the device.

Figure 6:
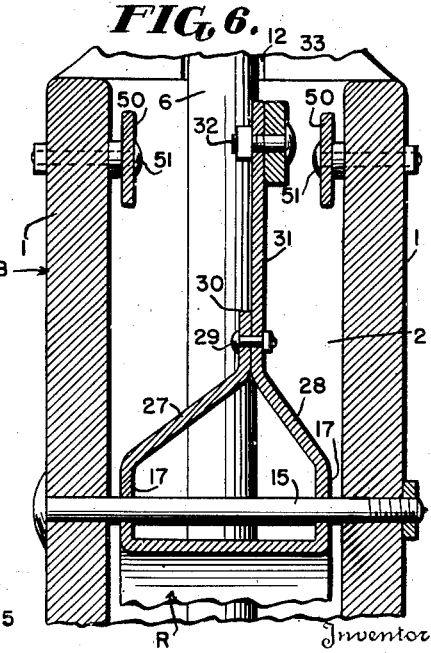
Figure 6 is an enlarged fragmentary detailed sectional view taken substantially on the line 6—6 of Figure 1, looking in the direction of the arrows.

Extending transversely through the body B at the central part thereof and supported by the walls or plates 1 is the bolt 15 which constitutes a mounting for a rock member R positioned between the walls or plates 1. This member R of a width closely approaching the width between the plates or walls 1 and the side flanges 17 of the member R are upwardly directed. The bolt 15, as is clearly illustrated in Figure 6, is disposed through these flanges 17 midway between the ends thereof whereby the member R is effectively supported for desired rocking movement upon the bolt 15 as its axis.

The forward end portion of the member R has disposed transversely thereacross a tubular member 18 snugly bridging the space between the flanges 17, the bore 19 of the member 18 registering with the openings 20 in said flanges.

Insertable within each end portion of the tubular member 18 through an opening 19 is an elongated arm 21 laterally continued from the upper end portion of a foot rest arm 22. As is clearly illustrated in the accompanying drawings, the arms 21 and 22 are substantially in right angular relation.

Each of the arms 21 is disposed through an arcuate slot 23 in a side wall or plate 1 at a desired distance in advance of the bolt 15, the curvature of such slot 23 having the bolt 15 as its center. The slot 23 is of a length sufficient to allow the member R to have required rocking or swinging movement in both directions.

Each of the arms 21 is locked within the tubular member 18 by a binding screw 24 or otherwise as may be preferred.

In practice, the arms 22 are substantially vertically disposed and slidably mounted on said arms 22 are the foot rests or stirrups 25, each of which being held in selected adjusted position along its arm 22 by a binding screw 26 or the like. The adjustments of the foot rests or stirrups 25 will, of course, be determined by the size of the child by whom the device is to be used.

The flanges 17 of the member R midway therein have rigid therewith the upwardly disposed converging arms 27 and 28, herein disclosed as meeting to one side of the transverse center of the member R, as particularly illustrated in Figure 6, although the invention is not to be limited in this respect.

The meeting extremities of the arms 27 and 28 are rigidly held together by a holding bolt 29 or the like which, as illustrated in Figure 6, is operatively disposed through a short extension 30 of the arm 27 and through the inner or lower portion of the elongated arm 31 which continues from the arm 28.

The arm 31 is herein disclosed as straight and at right angles to the bolt 15 and the upper or outer free end portion of this arm 31 is pivotally connected as at 32 with the forward end portion of an elongated link 33. The opposite or rear end portion of this link 33 is eccentrically pivotally connected as at 34 to a disk wheel 35 rotatably mounted on a stub shaft 36. This stub shaft 36 is engaged as at 37 within the central portion of a supporting structure 38 rigidly secured by the screws 39 or the like to the inner face of one of the side walls or members at the rear thereof.

The wheel or disk 35 constitutes a pulley with which is operatively engaged an endless belt 40 which extends downwardly and is operatively engaged with a second pulley 41 fixed for rotation with a rear axle 42. The opposite end portions of this axle 42 are rotatably disposed through and supported by the bearings 43 carried by the lower free extremities of the outboard bearing arms 44 rigidly secured as desired to the outer faces of the side walls or plates 1 at the rear thereof and closely adjacent to the lower margins thereof. These outboard arms 44 as herein disclosed, are disposed on pre-determined downward and outward angles.

Fixed to the opposite end portions of the axle 42 for rotation therewith and outwardly of the bearings 43 are the ground-engaging supporting wheels 45.

The rear portions of the flanges 17 of the member R have pivotally connected thereto as at 46 the short, rigid links 47 which are upwardly disposed and pivotally connected as at 49 to the rear extremities of the parallel levers 50. These levers 50 are in duplication and of pre-determined length. These levers 50 extend forwardly between the walls or plates 1 of the body G and each has its forward extremity pivotally connected as at 51 to a side wall or plate 1 of the body B.

Adjacent the rear ends thereof, the levers 50 have rigid therewith an upstanding yoke 52 substantially in the form of an inverted U and the intermediate or cross member 53 of the yoke 52 is rigidly secured to the saddle or seat S.

In practice, the child straddles the body B in a manner to permit the child to occupy the seat or saddle S and the feet of the child are engaged with the rests 25. The child will depress the seat or saddle S causing the rear portion of the member R to swing downwardly with a resultant rotation of the pulley or wheel 35. At the same time, the forward end of the member R will swing upwardly, raising the foot rests 25. The child will then throw its feet on the foot rests resulting in a reverse rocking of the member R. The rear mounting of the rock member R so positions the operative connections between the link 33 with the arm 31 and the wheel or pulley 35 to assure the rocking movements of the member R to effect continuous rotation of the pulley or wheel 35 with the liability of a dead center substantially eliminated.

From the foregoing description it is thought to be obvious that a vehicle constructed in accordance with my invention is particularly well adapted for use by reason of the convenience and facility with which it may be assembled and operated.

I claim:

1. A vehicle of the character described, comprising a body having two vertical, spaced walls, ground-engaging supporting wheels operatively connected with the body, a crank element rotatably supported between the walls, a driving connection between the crank element and certain of the supporting wheels, a relatively long rock member pivotally supported intermediate its ends between the walls for oscillation on an axis extending transversely of the body, the rock member being of a width substantially equal to the width of the space between the walls and having upstanding side flanges, an arm connected with said flanges intermediate the ends of the rock member and extending upwardly at one side of the longitudinal center of the space between the walls, a link pivotally connected at one end with the upper end of said arm and having its other end pivotally connected with said crank element whereby rocking movement of the rocking member will impart rotatory movement to the crank element, a pivot extending transversely between the flanges of the rocking member at one end thereof, a relatively long lever disposed between said walls and pivotally connected at an end remote from the pivot element with the walls for vertical movement on an axis extending transversely of the space between the walls, a relatively short link pivotally connected at one end with the rocking element carrying pivot and having its other end pivotally connected with the other end of the lever, a seat member, means connecting the seat member with the end of the lever adjacent to the said short link, and pedal elements secured to the other end of the rocking member and supported therefrom.

2. A vehicle of the character described in claim 1, wherein said side walls have opposite arcuate slots therein struck from the pivotal center for the rocking member, and the said connection between the pedals and the rocking member comprising a sleeve disposed between the flanges of the rocking member in line transversely of the body with said arcuate slots, the flanges having openings through which the ends of the sleeve are directed, an arm secured in each end of the sleeve and extending laterally through the adjacent arcuate slot, each arm having a depending portion, the said pedals being secured to the depending portions of the arms.

3. A vehicle of the character stated in claim 1, wherein said crank comprises a peripherally grooved pulley, a mounting bracket secured upon the inner side of one of said walls, a pivot pin carried by the mounting bracket and having the pulley rotatably mounted thereon, the first mentioned link having the said other end thereof pivotally secured eccentrically to the side of the pulley opposite from said mounting bracket.

4. A vehicle of the character described, comprising a body having two vertical spaced walls, ground engaging supporting wheels operatively connected with the body, a crank means rotatably supported between the walls, a driving connection between the crank means and certain of the supporting wheels, a relatively long rocking member of channel form disposed between the walls with the side flanges of the channel directed upwardly, a transverse pivot mounting extending across the rocking member through the said flanges thereof substantially midway between the ends of the rocking member and supporting the member for vertical oscillation between the walls, a pair of upwardly extending converging arms integral with the flanges of the rocking member, said arms being secured together and one of the arms being continued upwardly, a driving link connected at one end with the upper end of the said one of the arms and pivotally connected at its other end with said crank means for transmitting rotary motion to the crank means from the rocking member, a pair of levers disposed in spaced parallel relation between the walls and connected at one end of the pair to the walls for vertical swinging motion on an axis extending transversely of the body, the levers having the upper end of said one of the arms disposed therebetween, a pivot element extending transversely of the rocking member between the flanges at one end of the member, a relatively short link extending upwardly from the pivot element to and having pivotal connection with the levers at the other end of the pair, an inverted substantially U-shaped yoke having two spaced side portions each connected with one of said levers adjacent to the said other end of the pair, the yoke straddling the said links, a seat member supported above the body by the yoke, and foot pedals connected with the other end of the rocking member.

5. A vehicle of the character stated in claim 4, wherein the side walls have opposite arcuate slots therein struck from the pivot axis for the rocking member, and the connection between the foot pedals and the said other end of the rocking member comprising a bearing sleeve disposed between the flanges of the rocking member and aligned with apertures in the flanges, the sleeve and apertures being aligned with the arcuate slots, an arm extending through each slot into an end of the bearing sleeve, the outer part of each arm being down-turned upon the outer side of the adjacent wall, and each of the downwardly extending arm parts having a foot pedal secured thereto.

6. A wheeled vehicle of the character described, comprising a body, said body comprising two spaced side walls, a connecting and spacing block between the side walls at the forward end of the body, outwardly and downwardly directed arms secured to the body at the rear end thereof, the arms supporting between them at the lower ends an axle and ground engaging wheels, a mechanism supported between the walls and operatively coupled with said axle for imparting rotary motion thereto, a pair of vertically spaced bearings mounted between the walls at the forward end of the body in a line passing close to the rear side of said spacing block, a shaft extending vertically through said bearings along the rear side of the spacing block, a handle bar secured to the upper end of the shaft, a wheel fork carried upon the lower end of the shaft, and a steering wheel rotatably mounted between the wheel fork.

ALEXANDER A. KOLLMAN.

REFERENCES CITED

The following references are of record in the file of this patent:

UNITED STATES PATENTS

| Number | Name | Date |
| --- | --- | --- |
| 89,695 | Smith | May 4, 1869 |
| 669,079 | Flindall | Mar. 5, 1901 |
| 2,252,995 | Thomas | Aug. 19, 1941 |